United States Patent [19]

Ohyama et al.

[11] 4,376,212

[45] Mar. 8, 1983

[54] ISONONYL ACRYLATE MONOMER COMPOSITION

[75] Inventors: Eiji Ohyama; Hiroo Nagai; Masahito Yoshimura, all of Tokyo, Japan

[73] Assignee: Nissan Chemical Industries Ltd., Tokyo, Japan

[21] Appl. No.: 298,188

[22] Filed: Aug. 31, 1981

[30] Foreign Application Priority Data

Sep. 29, 1980 [JP] Japan ................................. 55/134465

[51] Int. Cl.$^3$ ............................................. C07C 69/54
[52] U.S. Cl. ................................... 560/205; 428/355; 526/328
[58] Field of Search ................ 560/205; 585/510, 512; 568/909

[56] References Cited

U.S. PATENT DOCUMENTS

| | | | |
|---|---|---|---|
| 2,504,682 | 4/1950 | Harlan, Jr. ........................ | 568/909 |
| 3,655,810 | 4/1972 | Chauvin et al. .................... | 585/512 |

*Primary Examiner*—Natalie Trousof
*Assistant Examiner*—L. Hendriksen
*Attorney, Agent, or Firm*—Oblon, Fisher, Spivak, McClelland & Maier

[57] ABSTRACT

An isononyl acrylate monomer composition of acrylates of $C_9$ alcohols obtained by a hydroformylation and a hydrogenation of $C_8$ olefins obtained by a dimerization of a butane-butene fraction containing n-butene separated from butadiene which comprise 3 to 20 wt. % of olefins having one isobutane skeleton and less than 3 wt. % of olefins having quaternary carbon and more than 90 wt. % of a total of n-octenes, monomethylheptenes and dimethylhexenes and 0.8 to 2.0 of a ratio of a total of n-octenes and monomethylheptenes to dimethylhexenes.

4 Claims, No Drawings

ISONONYL ACRYLATE MONOMER COMPOSITION

BACKGROUND OF THE INVENTION

1. Field of the Invention

The present invention relates to a novel isononyl acrylate composition composed of acrylates of $C_9$ alcohols.

2. Description of the Prior Art

Methyl acrylate, ethyl acrylate, butyl acrylate and 2-ethylhexyl acrylate as four typical acrylic esters of alkyl acrylates have been mainly produced in an industrial scale. Homopolymers or copolymers obtained by polymerizing one or more of the ester monomers, if necessary, a comonomer such as vinyl acetate, styrene and methyl methacrylate and a crosslinkable monomer such as 2-hydroxyethyl acrylate, acrylic acid, itaconic acid, acrylamide and glycidyl acrylate, have been used in various fields such as tackifiers, binders, paints, leather treatments, fiber treatments etc.

In the polymerization, an emulsion polymerization, a solution polymerization etc. can be employed.

The homopolymers and copolymers obtained by polymerizing or copolymerizing an alkyl acrylate can usually form soft, elastic films as a characteristic feature and have characteristics of excellent heat resistance, weathering resistance, and oxidation resistance. It has been usually considered by a person skilled in the art to study glasstransition points (Tg) in the productions of copolymers of alkyl acrylate suitable for the object usage. In general, a brittle point of a homopolymer or a copolymer decreases depending upon a decrease of Tg of the homopolymer or the copolymer. Thus, the glass-transition point Tg is used as a standard for softness of the homopolymer or the copolymer. In general, Tg and a brittle point of the homopolymer or the copolymer vary depending upon structures of an alkyl group of an alkyl acrylate. In the case of the straight chain alkyl group, Tg and the brittle point of the polymer decrease depending upon an increase of the number of carbon atoms but increase depending upon an increase of the number of carbon atoms over 8. Thus, it is considered that a homopolymer of n-octyl acrylate ($C_8$ alkyl group) has highest softness and tackiness at room temperature, among the homopolymers of alkyl acrylates. Among homopolymers of alkyl acrylates having the same number of carbon atoms, the homopolymer of the alkyl acrylate having a straight chain alkyl group has lowest Tg and lowest brittle point. In the case of a branched alkyl group, the homopolymer has higher Tg and higher brittle point than the case of a straight alkyl group. When an alkyl acrylate for lower Tg and lower brittle point is utilized in an industrial scale, the straight chain alcohol as the starting material is expensive and accordingly, the straight chain, alkyl acrylate is expensive. Therefore, 2-ethylhexyl acrylate which gives the lowest Tg among the economical four typical alkyl acrylates, has been mainly used. For example, a homopolymer of vinyl acetate has been mainly used for interior coating in buildings. The homopolymer of vinyl acetate has Tg of 28° C. In order to use it for forming a coated layer, it is necessary to blend a plasticizer. As an external plasticizer, dibutyl phthalate has been mainly used, however, there is found a tendency of migration of the plasticizer on the surface of the coated layer due to aging for a long time. Thus, the physical properties of the polymer in the coated layer are changed by a washing, a wipe-off, and a volatilization to cause phenomena of a deterioration or a bleeding-out. In order to prevent the phenomena, it has been proposed to decrease Tg by an internal plasticizing of the alkyl acrylate. In order to maintain the typical characteristics of the main polymer, it is preferable to reduce the amount of the internal plasticizing monomer. It is advantageous to use the internal plasticizing monomer for lower Tg.

In the productions of pressure-sensitive adhesives, a main monomer for soft and low Tg is admixed with a monomer for hard and high Tg used for improvement of adhesion and cohesion and a cross-linkable monomer or a monomer having a functional group is added and the monomers are copolymerized to obtain the object pressure-sensitive adhesives.

In the productions of paints, the production of acryl emulsions for thick coating paints which are called as elastic paints have been increased for external coating paints for buildings and mansions, because the acryl polymers have excellent weathering resistance, water resistance and durability and the coated layer has excellent elongation to prevent a water leakage accident caused by crackings of the wall. In order to obtain a coated layer having excellent elongation, a main monomer for a soft polymer having low Tg is needed.

SUMMARY OF THE INVENTION

It is an object of the present invention to produce a novel alkyl acrylate composition which is economical and can be produced in an industrial process and which is effective for producing a polymer having lower Tg than that of a polymer of 2-ethylhexyl acrylate.

The foregoing and other objects of the present invention have been attained by providing an isononyl acrylate monomer composition of acrylates of $C_9$ alcohols obtained by a hydroformylation and a hydrogenation of $C_8$ olefins obtained by a dimerization of butenes under an elevated pressure in the presence of at least one of nickel compounds selected from the group consisting of nickel oxygen compounds, nickel sulfur compounds and nickel organic acid salts, and at least one of metal alkyl halides having the formulas $R_3Al_2X_3$ and $RAlX_2$ where X is chlorine or bromine and R is an alkyl group.

DETAILED DESCRIPTION OF THE PREFERRED EMBODIMENTS

The present invention has been attained by studying novel alkyl acrylates for polymers having low Tg.

The polymers of the mixed isononyl acrylates have Tg lower than Tg of the polymers of 2-ethylhexyl acrylate. This is the surprising fact. Moreover, it is found that the polymer of nonyl acrylate obtained from nonanol as $C_9$ alcohols derived from diisobutylene obtained by a dimerization of isobutylene in the presence of an acidic catalyst (manufactured by Nissan Chem.) has Tg higher than Tg of the polymers of the isononyl acrylate monomer composition of the present invention.

The butane-butene fraction containing n-butene can be spent B—B fraction obtained by separating butadiene from a $C_4$ fraction obtained from an ethylene cracker; FCC B—B fraction obtained by a fluidized catalytic cracking of a fraction of light oil and heavy oil; raffinate $C_4$ fractions obtained in the productions of polybutene (liquid polyisobutene), t-butanol, methyl t-butyl ether and isobutene. In the use of these fractions, it is necessary to substantially separate butadiene, oxygen-containing compounds and sulfur-containing compounds as polar compounds by a conventional process.

The dimerization of the butane-butene fraction is performed under an elevated pressure in the presence of a nickel compound together with a metal alkyl halide.

The nickel compounds include (1) nickel oxygen compounds such as Ni diacetylacetonate,
(2) nickel sulfur compounds such as Ni dibutyl dithiocarbamate; and
(3) nickel organic salts such as Ni oleate.

The metal alkyl halides include the compounds having the formula

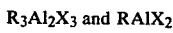

(X: Cl, Br; R: alkyl group)

The isononyl acrylate monomer composition of the present invention can be produced by the following processes: a process for esterifying acrylic acid with the $C_9$ alcohol composition; a process for interesterifying an alkyl acrylate derived from an alcohol having a boiling point lower than that of the $C_9$ alcohol composition, by using the $C_9$ alcohol; and a process for reacting acrylonitrile with the $C_9$ alcohol in the presence of sulfuric acid.

As described in References and Examples, the mixed isononyl acrylates of the present invention is a composition of monomers having Tg lower than Tg of the polymer of 2-ethylhexyl acrylate for soft and the lowest Tg among the typical monomers produced in the industrial processes. The polymers of the mixed isononyl acrylates have excellent low temperature characteristics of low Tg in comparison with the polymers of acrylic ester of $C_9$ alcohols derived from diisobutylene obtained by a dimerization of isobutyrene in the presence of an acid catalyst.

The inventors have found the characteristics and have confirmed that the acryl polymers obtained by using the mixed isononyl acrylates as a monomer source have excellent characteristics in view of the applications.

The isononyl acrylate monomer composition of the present invention is effective to produce a homopolymer or a copolymer which has lower Tg. The polymer is effective for forming a coated layer having excellent tackiness, softness and high adhesion, cohesion and holding power and high water resistance.

The present invention will be further illustrated by certain examples and references which are provided for purposes of illustration only and are not intended to be limiting the present invention. The part means "part by weight."

EXAMPLE 1

(I) Production of alcohols

A butane-butene fraction having a ratio of i-butene to n-butene of 0.2 by weight (butadiene, oxygen-containing compounds and sulfur-containing compounds are separated) was used as a starting material. The butane-butene fraction was dimerized by the process described in Japanese Examined Patent Publication No. 26482/1972. That is, 800 mg. of nickel acetonate, 300 ml. of the butane-butene fraction, 40 μl of water and 1.88 ml. of chlorodiethyl aluminum were charged into an autoclave from which air and moisture were purged. The mixture was stirred at 40° C. for 24 hours and the resulting oligomer was distilled to obtain $C_8$ olefins. The $C_8$ olefin composition was analyzed. The results are as follows:

| | |
|---|---|
| (1) n-octenes | 7.0 wt. % |
| (2) monomethyl heptenes | 48.0 wt. % |
| (3) dimethyl hexenes | 43.5 wt. % |
| (4) others | 1.5 wt. % |
| (5) olefins having one isobutane skeleton | 7.5 wt. % |
| (6) olefins having quaternary carbon | 0.5 wt. % |
| (7) (1) + (2) + (3) | 98.5 wt. % |
| (8) ((1) + (2))/(3) | 1.26 |

In a 2 liter stainless steel autoclave equipped with a vertical stirrer, dicobalt octacarbonyl was dissolved in the olefin fraction at a ratio of 4 g. of the dicobalt octacarbonyl to 1 kg of the olefin fraction. A hydroformylation was carried out by a batch process under the condition feeding an oxo gas having a volumetric ratio of hydrogen to carbon monoxide of 1.3 under a pressure of 160 kg/cm²G. at 150° C. After 90 minutes, the gas absorption was substantially stopped to stop the reaction. The catalyst was separated from the reaction mixture and the mixture was washed with water. A mixed catalyst of a Cu chromite powder catalyst and a nickel powder catalyst was added to the reaction mixture at a ratio of 10 weight percent and a hydrogenation was carried out at 170° C. and 50 kg/cm²G. for about 120 minutes. The catalyst was separated from the reaction mixture and the unreacted olefins and the high boiling impurities as by-products were separated by a distillation to obtain a $C_9$ alcohol composition.

The $C_9$ alcohol composition was analyzed. The results are as follows:

(1) straight chain-alcohols; 5 wt.%
(2) one branched chain-alcohols; 55 wt.%
(3) two or three branched chain-alcohols; 40 wt.% and
(4) an average branched chains per molecule of 1.4.

The components (1)-(3) were analyzed by a gas chromatography with silylation of the alcohols. The component (4) was analyzed by an NMR spectrography.

(II) Production of mixed isononyl acrylates and homopolymer of mixed isononyl acrylates Mixed isononyl acrylates were obtained by an esterification of the isononyl alcohol composition obtained by the process (I) in the presence of hydroquinone as a polymerization inhibitor.

The alkyl skeletons of the mixed isononyl acrylates were identical with those of the $C_9$ alcohol composition.

Into a reactor, 150 g. of the mixed isononyl acrylate, 60 g. of toluene and 0.5 wt.% of azobisisobutyronitrile as a polymerization initiator (to total charges) were charged and a reaction was performed at 70° to 75° C. for 5 hours to obtain a toluene solution of a homopolymer. A conversion was 100%. The homopolymer was washed with a solvent and dried in vacuum to obtain a homopolymer. Tg of the homopolymer was measured by a differential thermal analysis. The result is shown in Table 1.

REFERENCE 1

In accordance with the process of Example 1 except using $C_9$ alcohols obtained from diisobutylene (Nissan Chem. Ind.) or 2-ethylhexyl alcohol instead of the isononyl alcohol composition, each homopolymer was produced, and Tg of each homopolymer was measured. The results are shown in Table 1.

TABLE 1

| | Alkyl acrylate | $T_g$ |
|---|---|---|
| Exp. 1 | i-C$_9$A[1] | −82° C. |
| Ref. 1-1 | C$_9$A[2] | −65° C. |
| Ref. 1-2 | 2EHA[3] | −73° C. |

Note:
[1]i-C$_9$A: mixed isononyl acrylates
[2]C$_9$A: nonyl acrylate
[3]2EHA: 2-ethylhexyl acrylate Among alkyl esters which have been produced in industrial mass productions, 2-ethylhexyl acrylate is effective to produce a homopolymer having the lowest Tg. However, the isononyl acrylate monomer composition can produce a homopolymer having Tg lower than Tg of the homopolymer of 2-ethylhexyl acrylate and also lower than Tg of a homopolymer of nonyl acrylates obtained from C$_9$ alcohols derived from dimers of isobutene.

EXAMPLE 2 and REFERENCE 2

Evaluation of adhesive tape prepared by using homopolymer

Each adhesive tape was prepared by using each toluene solution of each of the three homopolymers obtained in Example 1 and Reference 1. In the preparation of the adhesive tape, each solution of the polymer was coated on a release paper in a thickness of 30μ and dried to form a coated layer and then the coated layer was transferred on each polyethyleneterephthalate film having a thickness of 50μ to prepare each adhesive tape. Th adhesive tapes were tested. The results are found in Table 2.

TABLE 2

| | Homopolymer | J. Dow test[1] ball test (15° C.) 6/32 inch |
|---|---|---|
| Ref. 2-1 | 2EHA | 135 sec. |
| Ref. 2-2 | C$_9$A | 90 sec. |
| Exp. 2 | i-C$_9$A | 180 sec. |

Note:
[1]Each scale ball having a diameter of 6/32 inch was rolled over a slant plate at an angle of 30 degree from the upper position of 10 cm from the tacky surface of 10 cm and each time for passing through the tacky surface of 10 cm was measured.

The polymer of mixed isononyl acrylate had superior tackiness which is imparted by the characteristic of low Tg.

EXAMPLE 3

Production of emulsion polymer and characteristic of coated layer

The mixed isononyl acrylates obtained by the process of Example 1 was mixed with vinyl acetate at a ratio of 85:15 or 70:30 by weight to prepare each mixed monomer and each emulsion polymer was produced from the mixed monomer as follows:

| Composition: | |
|---|---|
| (1) Gosenol GM-14X (Nippon Gosei Kagaku Co. Ltd.) | 2 wt. parts |
| Pelex OTP (Kao Soap Co. Ltd.) | 2.8 wt. parts |
| Sodium bicarbonate | 0.4 wt. parts |
| Water | 140 wt. parts |
| (2) Potassium superphosphate | 0.2 wt. parts |
| Water | 10 wt. parts |
| (3) Monomer mixture | 100 wt. parts |

Into a reactor, the components (1) were charged and heated to 70° C. and then, the components (2) were charged and the mixture was kept at 70°–75° C. and then, the component (3) was added dropwise during 2 hours. After the addition, the mixture was heated to 85° C. and the reaction was continued for 1.5 hours. The conversion for the resulting emulsion polymer was 100% and the emulsion contained 39–40% of the solid component. Each of the two emulsion polymers was coated on a glass plate or a tin plate as a coated film having a thickness of 50μ by an applicator and the characteristics of each coated layer were evaluated. The results are shown in Table 3, 4.

REFERENCE 3

In accordance with the process of Example 3 except using vinyl acetate or a monomer mixture of two acrylic esters obtained in Reference 1 and vinyl acetate at each ratio shown in Table 3, each emulsion polymer was produced and characteristics of each coated layer were evaluated. The results are shown in Table 3, 4.

TABLE 3

| Reference | Ref. 3-1 | Ref. 3-2 | Ref. 3-3 | Exp. 3-1 |
|---|---|---|---|---|
| Ratio of components in emulsion copolymerization: | VAc[1] | VAc/ 2.EHA (85/15) | VAc/ C$_9$A (85/15) | VAc/ i-C$_9$A (85/15) |
| Pencil hardness | 2H | H | H | F |
| Bending test: | | | | |
| 15° C. | 8mmφ[2] X | 8mmφ Δ | 8mmφ Δ | 2mmφ Δ ~ ○ |
| 0° C. | — | — | — | 2mmφ — |

TABLE 3'

| Reference | Ref. 3-4 | Ref. 3-5 | Exp. 3-2 |
|---|---|---|---|
| Ratio of components in emulsion copolymerization: | VAc/ 2.EHA (70/30) | VAc/ C$_9$A (70/30) | VAc/ i-C$_9$A (70/30) |
| Pencil hardness | 4B | 4B | 5B |
| Bending test: | | | |
| 15° C. | 2mmφ ◎ | 2mmφ ◎ | 2mmφ ◎ |
| 0° C. | Δ | Δ | ◎ |

Note:
Test: JISK5400: Test of paint (general)
[1]VAc: vinyl acetate
[2]X: remarkably inferior
Δ: inferior
○: good
◎: excellent The results show the fact that the copolymers of vinyl acetate and the mixed isononyl acrylates of the present invention had superior plasticizability and superior cold resistance to those of the copolymers obtained by using 2-ethylhexyl acrylate or nonyl acrylate.

TABLE 4

| | Ref. 3-1 | Ref. 3-2 | Ref. 3-3 | Exp. 3-1 |
|---|---|---|---|---|
| Ratio of components in emulsion copolymerization: | VAc[1] | VAc/ 2.EHA (85/15) | VAc/ C$_9$A (85/15) | VAc/ i-C$_9$A (85/15) |
| Adhesion plywood | | | | |
| Before immersion in water (kg/cm$^2$) (A) | 33.5 | 35 | 31.8 | 45 |
| After immersion in water for 3 hours | 3.9 | 8.3 | 7.0 | 12.0 |

TABLE 4-continued

|  | Ref. 3-1 | Ref. 3-2 | Ref. 3-3 | Exp. 3-1 |
|---|---|---|---|---|
| (kg/cm$^2$) (B) | | | | |
| Ratio of adhesion (%) (B/A) | 11.6 | 23.7 | 22.0 | 26.7 |

The results show the fact that the copolymers of vinyl acetate and the isononyl acrylate composition of the present invention had superior adhesion and water resistance to those of the copolymers obtained by using 2-ethylhexyl acrylate or nonyl acrylate.

EXAMPLE 4 and REFERENCE 4

Production of copolymer and evaluation of adhesive tape

Each monomer mixture was prepared by blending 65 parts of each of the three acrylic esters produced in Example 1 and Reference 1, 30 parts of methyl methacrylate and 5 parts of acrylic acid.

Into a reactor, 33 parts of a mixture of ethyl acetate and 33 parts of toluene as the solvent and 0.5 wt.% (based on total charges) of azobisisobutyronitrile as the polymerization initiator were charged and each monomer mixture was added dropwise during 1.5 hours at a reaction temperature of 70° C. After the addition, the reaction was continued at the same temperature for 6 hours.

The resulting solutions of the polymer had not different appearance and each polymerization conversion was 100%.

Each adhesive tape was prepared by using each solution of the three kinds of the polymers by the process of Example 2 and was tested. The results are shown in Table 5.

TABLE 5

|  | Composition of copolymer | Adhesion$^{(1)}$ test (15° C.) |
|---|---|---|
| Ref. 4-1 | 2EHA/MMA$^{(2)}$/AA$^{(3)}$ | 770 g/ 20 mmφ |
| Ref. 4-2 | C$_9$A/MMA/AA | 700 g/ 20 mmφ |
| Exp. 4 | i-C$_9$A/MMA/AA | 1100 g/ 20 mmφ |

$^{(1)}$Each adhesive tape (20 mm × 100 mm) was bonded on a mild steel plate under pressure for one day. Each peeling test was carried out at 90° C. by an autograph at a peeling speed of 100 mm/min.
$^{(2)}$MMA: methyl methacrylate
$^{(3)}$AA: acrylic acid The results show the fact that the copolymer obtained by using the mixed isononyl acrylates of the present invention had superior adhesion to those of the copolymers obtained by using 2-ethylhexyl acrylate or nonyl acrylate.

EXAMPLE 5 and REFERENCE 5

Production of copolymer having different ratio of monomers and evaluation of adhesive tape of copolymer In accordance with the process of Example 4 except using the monomers at ratios shown in Table 6, each copolymer was produced. The two kinds of acrylic esters obtained in Example 1 and Reference 1 were used.

TABLE 6

|  | Exp. 5-1 | Ref. 5-1 | Exp. 5-2 | Ref. 5-2 | Exp. 5-3 | Ref. 5-3 |
|---|---|---|---|---|---|---|
| Toluene | 40 | 40 | 40 | 40 | 40 | 40 |
| Isononyl acrylate composition | 70 | — | 65 | — | 60 | — |
| 2-Ethylhexyl acrylate | — | 70 | — | 65 | — | 60 |
| Vinyl acetate | 25 | 25 | 30 | 30 | 35 | 35 |
| Acrylic acid | 5 | 5 | 5 | 5 | 5 | 5 |
| Azobisisonitrile (%) | 0.5 | 0.5 | 0.5 | 0.5 | 0.5 | 0.5 |

The resulting copolymers had no difference of appearance. The polymerization conversion was 100% in all cases.

Each adhesive tape was prepared by the process of Example 2 and was tested. The results are shown in Table 7.

TABLE 7

|  | Exp. 5-1 | Ref. 5-1 | Exp. 5-2 | Ref. 5-2 | Exp. 5-3 | Ref. 5-3 |
|---|---|---|---|---|---|---|
| Holding power$^{(1)}$ test (15° C.) | 3 min. 18 sec. | 1 min. | 3 min. 30 sec. | 2 min. 16 sec. | 7 min. 28 sec. | 7 min. 5 sec. |
| Adhesion test$^{(2)}$ (15° C.) (g/20 mm width) | 2300 | 833 | 2800 | 2300 | 3500 | 3200 |

$^{(1)}$Each adhesive tape (20 mm × 100 mm) was overlapped for the area of 20 mm × 20 mm on a mild steel plate. A load of 1 kg. was applied in the perpendicular direction and each creeping time was measured.
$^{(2)}$Each adhesive tape (20 mm × 100 mm) was bonded on a mild steel plate under pressure for one day. Each peeling test was carried out at 90° C. by an autograph at a peeling speed of 100 mm/min.

In the tests, the characteristics were compared by varying the ratio of vinyl acetate to acrylic ester. The copolymers of the mixed isononyl acrylates of the present invention had superior cohesion and adhesion in comparison with the copolymer of 2-ethylhexyl acrylate at each ratio.

The content of the mixed isononyl acrylate of the present invention can be smaller than the content of 2-ethylhexyl acrylate to impart the same cohesion and adhesion. This is remarkably advantageous from the economical viewpoint.

EXAMPLE 6 and REFERENCE 6

Three kinds of monomer mixtures were prepared by blending 70 parts of each acrylic ester of Example 1 or Reference 1, 25 parts of vinyl acetate and 5 parts of acrylic acid.

Into a reactor, 40 parts of toluene as the solvent, 0.5% (based on total charges) of azobisisocyanate as the polymerization initiator were charged and each monomer mixture was added dropwise during 1.5 hours at a reaction temperature of 70° C. After the addition, the reaction was continued at the same temperature for 6 hours. The resulting solutions of the polymer had not different appearance and each polymerization conversion was 100%. Tolylenediisocyanate was added to each solution of the copolymer at a stoichiometric equivalent to acrylic acid to result in each crosslinking.

Each adhesive tape was prepared by using each crosslinked copolymer by the process of Example 2 and was tested by the tests described in Example 5. The results are shown in Table 8.

TABLE 8

|  | Composition of copolymer | Holding power test (15° C.) |
|---|---|---|
| Ref. 6-1 | 2EHA/VAc/AA | 8 min. |
| Ref. 6-2 | C$_9$A/VAc/AA | 14 min. |
| Exp. 6 | i-C$_9$A/VAc/AA | 100 min. |

The cohesion force of the crosslinked copolymer of the present invention had remarkable difference from the references.

We claim:

1. An isononyl acrylate monomer composition of acrylates of C$_9$ alcohols obtained by a hydroformylation and a hydrogenation of C$_8$ olefins obtained by a dimerization of butenes under an elevated pressure in the presence of at least one of nickel compounds selected from the group consisting of nickel oxygen compounds, nickel sulfur compounds and nickel organic acid salts, and at least one of metal alkyl halides having the formulas $R_3Al_2X_3$ and $RAlX_2$ where X is chlorine or bromine and R is an aklyl group.

2. The isononyl acrylate monomer composition according to claim 1 wherein the C$_8$ olefins are obtained by the dimerization of butenes in a butane-butene fraction having butadiene, oxygen-containing compounds and sulfur-containing compounds substantially removed therefrom.

3. The isononyl acrylate monomer composition according to claim 1 wherein the C$_8$ olefins comprise 3 to 20 wt.% of olefins having one isobutane skeleton and less than 3 wt.% of olefins having quaternary carbon and more than 90 wt.% of a total of a n-octenes, monomethylheptenes and dimethylhexenes and 0.8 to 2.0 of a ratio of a total of n-octenes and monomethylheptenes to dimethylhexenes.

4. The isononyl acrylate monomer composition according to claim 1 or 2 wherein said nickel compound is selected from Ni diacetylacetonate, Ni dibutyl dithiocarbamate and Ni oleate.

* * * * *